United States Patent [19]

Mandel

[11] Patent Number: 4,544,428

[45] Date of Patent: Oct. 1, 1985

[54] METHOD OF MANUFACTURING A PRESSURE TANK

[75] Inventor: Goetz Mandel, Kirchseeon, Fed. Rep. of Germany

[73] Assignee: Messerschmitt-Bolkow-Blohm GmbH, Fed. Rep. of Germany

[21] Appl. No.: 540,668

[22] Filed: Oct. 11, 1983

[30] Foreign Application Priority Data

Oct. 12, 1982 [DE] Fed. Rep. of Germany ....... 3237761

[51] Int. Cl.$^4$ .............................................. B23P 17/00
[52] U.S. Cl. .................................... 156/161; 156/162; 156/172; 156/187; 156/498
[58] Field of Search ............... 156/425, 428, 429, 195, 156/171–172, 173, 175, 446, 498; 29/452, 458; 220/414, 3

[56] References Cited

U.S. PATENT DOCUMENTS

| 3,144,952 | 8/1964 | Uhlig et al. | 220/3 |
| 3,184,092 | 5/1965 | George . | |
| 3,207,352 | 9/1965 | Reinhart | 220/3 |
| 3,240,644 | 3/1966 | Wolff | 156/173 X |
| 3,969,812 | 7/1976 | Beck | 29/458 X |
| 4,113,132 | 9/1978 | Steiner | 220/3 X |

Primary Examiner—David Simmons
Attorney, Agent, or Firm—McGlew and Tuttle

[57] ABSTRACT

A method of manufacturing a pressure tank comprises forming the tank with an inner thin wall of light metal and applying a backup wrapping of resin impregnated fibers having a large breaking strength and a small coefficient of thermal expansion to the tank and the tank is cooled in order to compensate for the accumulating filament tension during the winding operation.

5 Claims, 1 Drawing Figure

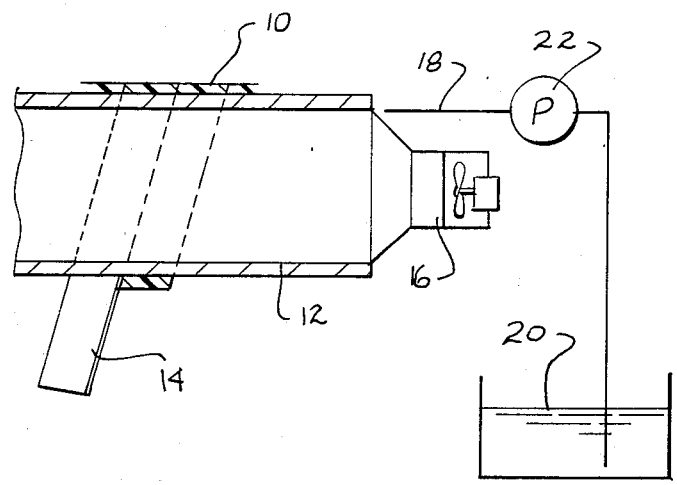

METHOD OF MANUFACTURING A PRESSURE TANK

FIELD AND BACKGROUND OF THE INVENTION

This invention relates in general to the manufacture of tanks and in particular to a new and useful method of manufacturing a pressure tank.

In the manufacture of pressure tanks of lightweight material and composite structure, it is known to reinforce an inner tank of light metal by a back-up wrapping of filaments, threads or some tissue. This back-up wrapping relieves the inner tank of load to the effect that the sum total of pressure forces acting on the tank are taken up only partly by the inner tank, and mostly by the back-up wrapping. To minimize the weight of the tank for the given pressure and volume, an inner tank and wrapping material having as great a breaking strength as possible are to be provided.

If the load on the tank wall due to the pressure from the inside is to be taken up by both the inner tank and the wrapping, the absolute expansions of the inner tank and the wound filament must be equal to each other. For this reason, a combination of filaments having a small coefficient of thermal expansion, such as carbon fibers, with light metal inner tanks (aluminum or magnesium) are advantageously preferred in the lightweight construction.

To obtain a lightweight structure, it is sought to take up most of the load by the wrapping and as little as possible by the inner tank since the breaking strength of this tank is small. In consequence, inner tanks with very thin walls are provided. The wrapping operation is necessarily effected with prestressed filaments. The filament stress accumulated during the wrapping operation results in a load acting on the inner tank and involving the risk of breaking the thin walls of the inner tank.

SUMMARY OF THE INVENTION

The invention is directed to a method of making a pressure tank eliminating the risk of the collapse of the inner tank.

To this end and in accordance with the invention, a thin inner wall of the tank is cooled as a back-up resin with impregnated fibers and small coefficient of thermal expansion is wrapped around the inner wall.

The essence of the invention is that the great difference in the coefficients of thermal expansion of the winding filament and the light metal is utilized for neutralizing the accumulation of the filament tension during the wrapping process by simultaneously causing the light metal inner tank to shrink. Since the temperature drop needed for eliminating the load through the filament tension is about 10° C., the cooling is easy. It may be effected by introducing into the tank a cooled liquid prior to or during the winding operation, or by supplying cool air from a conditioning system. The cooling is also needed because no compensation for the accumulating filament tension by raising the internal pressure is possible, since such an internal pressure would deform the thin inner tank.

Accordingly it is an object of the invention to provide an improvement in the manufacturing of pressure tanks in which a thin inner wall is covered by a wrapping of resin impregnated fibers and the inner wall is cooled in order to provide a shrinkage to compensate for accumulating filament tension in the back-up wrapping of resin impregnated fibers.

A further object of the invention is to provide a method of manufacturing a pressure tank which is simple to execute and inexpensive to carry out.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The only FIGURE of the drawings is a schematic sectional view of a pressure pipe being constructed in accordance with the method of the invention.

GENERAL DESCRIPTION OF THE PREFERRED EMBODIMENTS

Referring to the drawings in particular, the invention embodied therein comprises a method of manufacturing a pressure tank generally designated 10 which includes a thin inner wall of a lightweight metal 12. In accordance with the invention the wrapping of resin impregnated fibers which have large breaking strength and a small coefficient of thermal expansion designated 14 is wrapped around the thin wall 12 while the thin wall is cooled for example by blowing air from an air conditioning unit 16 into the interior of the tank as it is being wrapped in order to compensate for accumulation of filament tension during the winding operation. By cooling the thin metal wall 12 it is caused to shrink. The drawing also shows another manner of cooling the wall by directing a cooling water through a line 18 from a reservoir 20 using a pump 22. The water is directed through a portion or the whole interior of the tank as the winding is carried out. Liquid from the tank 20 may advantageously be cooled such as by using suitable cooling coils.

EXAMPLE

Provided is the manufacture of a gas storage tank for supplying a space vehicle engine and having a volume of about 100 liters. This is done by wrapping an inner tank of aluminum having a wall thickness of 2 mm, with carbon fibers impregnated with a synthetic resin. The wall thickness of the wrapping varies in accordance with the shape of the tank and amounts to a multiple of the inner tank wall thickness, so that the pressures acting on the tank wall are taken up to 80 to 90% by the wrapping. During the winding operation, effected in a manner known per se, about 20 liters of a liquid having a temperature by about 10° C. lower than the ambience is introduce into the tank, whereby the rotating tank is satisfactorily cooled. With the winding operation terminated, the cooling liquid is drained and the tank is stored with a slight internal excess pressure up to the time of its use.

While specific embodiments of the invention have been shown and described in detail to illustrate the application of the principles of the invention, it will be understood that the invention may be embodied otherwise without departing from such principles.

I claim:

1. A method of manufacturing a pressure tank, comprising forming a thin inner wall of light metal, applying a back-up wrapping of resin-impregnated fiber having a large breaking strength and a small coefficient of thermal expansion while it is maintained under tension over the thin inner wall which tends to cause an increasing winding coil load by accumulation of filament tension, and cooling the inner tank to offset the increasing winding coil load.

2. A method according to claim 1, wherein during the wrapping operation the inner tank is filled with a cooled liquid.

3. A method according to claim 1, wherein during the wrapping operation a cooled gas is directed into the inner tank within the thin inner wall.

4. A method according to claim 1, wherein the inner tank thin wall is cooled down by about 10° C. relative to the ambient temperature.

5. A method of manufacturing a pressure tank having a thin inner wall of light metal and a back-up wrapping over the inner wall with prestressed filaments which are impregnated with resin which have a large breaking strength and a small coefficient of thermal expansion, said method comprising winding the back-up wrapping over the thin inner wall under tension while neutralizing accumulation of fiber tension during the winding by cooling the inner wall.

* * * * *